United States Patent [19]

Alstetter et al.

[11] Patent Number: 4,691,448
[45] Date of Patent: Sep. 8, 1987

[54] APPARATUS AND PROCESS FOR DRYING FINELY GRAINED SOLID PARTICLES

[75] Inventors: Franz Alstetter; Herbert Schiele, both of Karlsfeld; Peter Sedlmayer, Munich; Günther Hultsch, Oberschleissheim, all of Fed. Rep. of Germany

[73] Assignee: Krauss-Maffei A.G., Krauss-Maffei, Fed. Rep. of Germany

[21] Appl. No.: 766,409

[22] Filed: Aug. 16, 1985

[30] Foreign Application Priority Data

Aug. 16, 1984 [DE] Fed. Rep. of Germany ....... 3430127

[51] Int. Cl.$^4$ .............................................. F26B 5/08
[52] U.S. Cl. ........................................ 34/8; 34/57 E; 34/57 D; 34/58; 34/10
[58] Field of Search .................. 34/8, 58, 57 E, 57 A, 34/57 B, 10, 57 C, 57 D

[56] References Cited

U.S. PATENT DOCUMENTS

| | | |
|---|---|---|
| 2,856,273 | 10/1958 | Beber et al. |
| 3,241,246 | 3/1966 | Pollock |
| 3,500,552 | 3/1968 | Farkas et al. |
| 3,938,259 | 2/1976 | Ormos et al. |
| 4,432,148 | 2/1984 | Darbonne et al. ........................ 34/8 |
| 4,461,093 | 7/1984 | Hultsch et al. ........................ 34/58 |

FOREIGN PATENT DOCUMENTS

| | | |
|---|---|---|
| 369531 | 1/1982 | Austria |
| 0059858 | 2/1982 | European Pat. Off. |
| 1019604 | 11/1957 | Fed. Rep. of Germany |
| 1067413 | 10/1959 | Fed. Rep. of Germany |
| 1910003 | 2/1969 | Fed. Rep. of Germany |
| 2135687 | 7/1971 | Fed. Rep. of Germany |
| 2622565 | 5/1976 | Fed. Rep. of Germany |
| 3141549 | 10/1981 | Fed. Rep. of Germany |
| 613874 | 11/1975 | Switzerland |

Primary Examiner—Larry I. Schwartz
Attorney, Agent, or Firm—Robert J. Koch

[57] ABSTRACT

Agitator elements are provided in an apparatus and a process for the transport of heat and material between finely grained solid particles and a flow of carrier gas in a rotating fluid bed in order to prevent settling of coarse particles or agglomerates. The agitator elements are immersed into the fluid bed and move at a velocity different from that of the revolving fluid bed.

23 Claims, 9 Drawing Figures

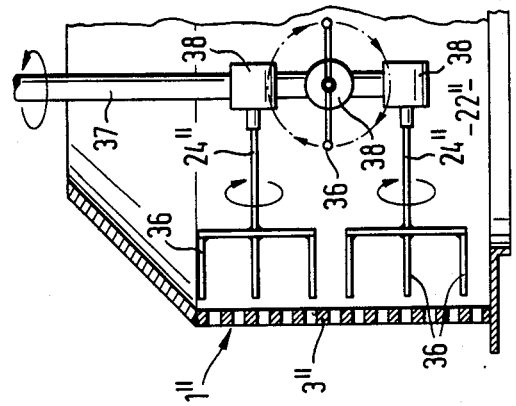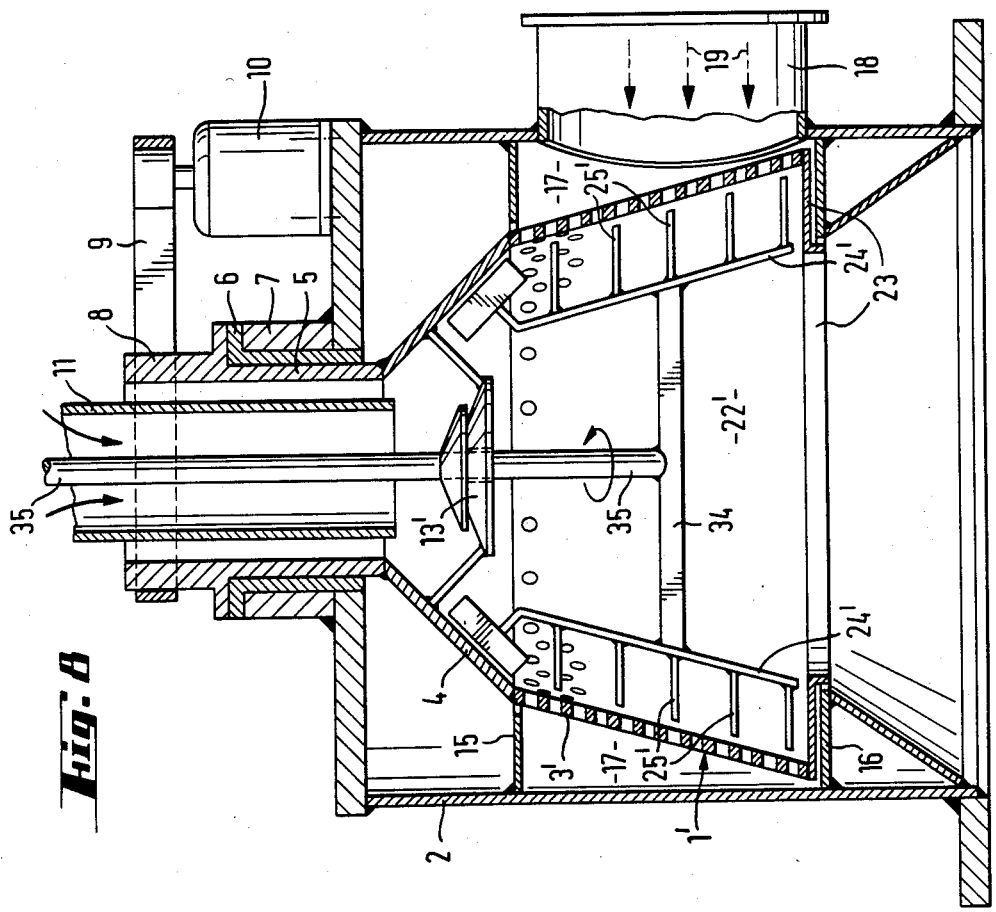

APPARATUS AND PROCESS FOR DRYING FINELY GRAINED SOLID PARTICLES

BACKGROUND OF THE INVENTION

1. Field of the Invention

The invention relates to a process and an apparatus for the drying, more in particularly the drying of fine grain solid particles in a fluidized bed.

2. Description of the Prior Art

West German Pat. No. 19 10 003 or West German Auslegeschrift 26 22 565 show centrifugal moving bed or fluidized bed dryers, in which the solid particles to be held in suspension are introduced from above or below into a screening drum.

In order to insure that all of the solid particles introduced into the turbulent layer forming the fluid bed are maintained in suspension by the carrier flow of gas, a suitable grain size distribution must be present. This is to prevent appreciable proportions of the solid particles remaining on the surface of the screening drum or being carried out in the radially inward direction from the turbulent layer by a carrier gas stream. This condition is part of a technical problem which in most cases cannot be corrected at a justifiable cost.

Numerous wet products to be dried in a fluid bed tend to agglomerate. The agglomerates then behave in the manner of coarse particles and as a result of their unfavorable fluidizing behavior can no longer be retained in the turbulent layer by the flow of gas, whereupon they sediment on the surface of the screening drum where they gradually form a deposit capable of clogging the orifices of the screening drum and thereby stopping the continuous process.

A further effect interfering with or preventing the normal operation of the process occurs when a very finely grained wet product to be dried is introduced into the screening drum. Due to the presence of strong interparticle adhesion forces, which cannot be overcome by the forces of the flow in the gravity field of the earth, so-called canals are formed, through which the carrier gas stream passes ineffectively, without fluidizing the solid particles in the area affected.

SUMMARY OF THE INVENTION

In is an object of the invention to eliminate or extensively reduce the interference with the fluidization of the moving bed by the agglomeration of solid particles.

This object is attained by exposing finely grained solid particles in a fluid bed to a centrifugal field in a screening drum traversed by a carrier flow of gas penetrating through the orifices of the screening drum in a radial manner from the outside to the inside, so that they are maintained in suspension at an appreciable relative velocity between the solid particle and the flow of carrier gas, characterized in that the solid particles are agitated mechanically in addition to the swirling effect caused by the flow of carrier gas, in the fluid bed. The measure provides for the mechanical comminution of solid particles agglomerated to coarse particles within the area of the turbulent layer, thereby obtaining a particle size that may be maintained in suspension by the carrier flow.

A particular advantage is obtained in the case of agglomerates or coarse particles that cannot be divided and which as the result of their size, are inappropriate for the formation of a turbulent layer. The larger particles descend in the radially outward direction and settle on the inner surface of the screening drum. Agglomerates and coarse particles of this type are seized according to the invention by agitator elements and carried out by mechanical means from the revolving turbulent layer, together with the fine particles. They may be separated by sieving and screening from the treated fine particles, comminuted in a subsequent process step and reintroduced in the fluid bed.

An apparatus for an embodiment of this process step comprises a plurality of mechanical agitator elements or comminuting tools within the screening drum immersing into the fluid bed. The agitator elements may extend over the entire length or only a part of the axial length of the screening drum jacket, with said agitator elements being fastened appropriately to holder arms protruding into the screening drum.

In an embodiment representing a technically simple solution the holder arms are fastened stationarily to the screening drum housing so that the angular velocity of the agitator elements immersing into the fluid bed is equal to zero.

In a further embodiment the holder arms are attached rotatingly to the screening drum housing, so that a differential rpm may be set between the screening drum and the agitator elements. The agitator installation may thus be adapted to different operating conditions and material properties.

For operations requiring a particularly strong swirling of solid particles tending to agglomeration, it is convenient to provide rotating drives on the holder arms, whereby the agitator elements entering the fluid bed may be driven essentially perpendicularly to the axis of rotation of the screening drum.

Appropriately, the agitator elements comprise blades in the shape of plates, mounted in planes perpendicular to the axis of rotation of the screening drum on the holder arms. While providing favorable agitating and comminution effects for agglomerates, these blades offer only a slight resistance to flow. The aforementioned effect may be enhanced further by designing the front edge of the blade as a cutting edge. The blades offer only a slight resistance to flow. The aforementioned effect may be enhanced further by designing the front edge of the blade as a cutting edge. The blades are advantageously arranged pivotingly on the holder arms, so that for example with an identical angular deflection of all of the blades located on a holder arm, an axially oriented transport component may be imparted to the flow of the fluid bed, or that for example in the case of opposing angular settings an enhanced swirling effect may be obtained.

In an advantageous embodiment the blades are curved in the manner of a plowshare, so that in addition to the comminution of agglomerates by the plowshare-like cutting edge of the blade, a rearranging effect is obtained, whereby turbulent layers located radially outward are moved into radially inward turbulent layers.

In order to obtain a transport effect acting in the radial direction of the screening drum for large size solid particles or nondivisible agglomerates, the holder arm is mounted obliquely to the axis of rotation of the screening drum, so that the agitator elements are in trailing positions. The transport effect for solid particles of a size unsuitable for fluidizing, is thereby established as a gradient.

In a technically particularly simple form of embodiment the agitator elements are in the form of pins.

BRIEF DESCRIPTION OF THE DRAWINGS

Certain examples of embodiment of the invention shall be explained in more detail below, with reference to the drawing. In the schematic drawing:

FIG. 8 shows an apparatus according to the invention with a conical screening drum; and FIG. 9 shows a cylindrical screening drum with agitator elements revolving around the axle of the drum and rotatable around their own rotating axle.

DETAILED DESCRIPTION OF THE PREFERRED EMBODIMENTS

Figure 1:
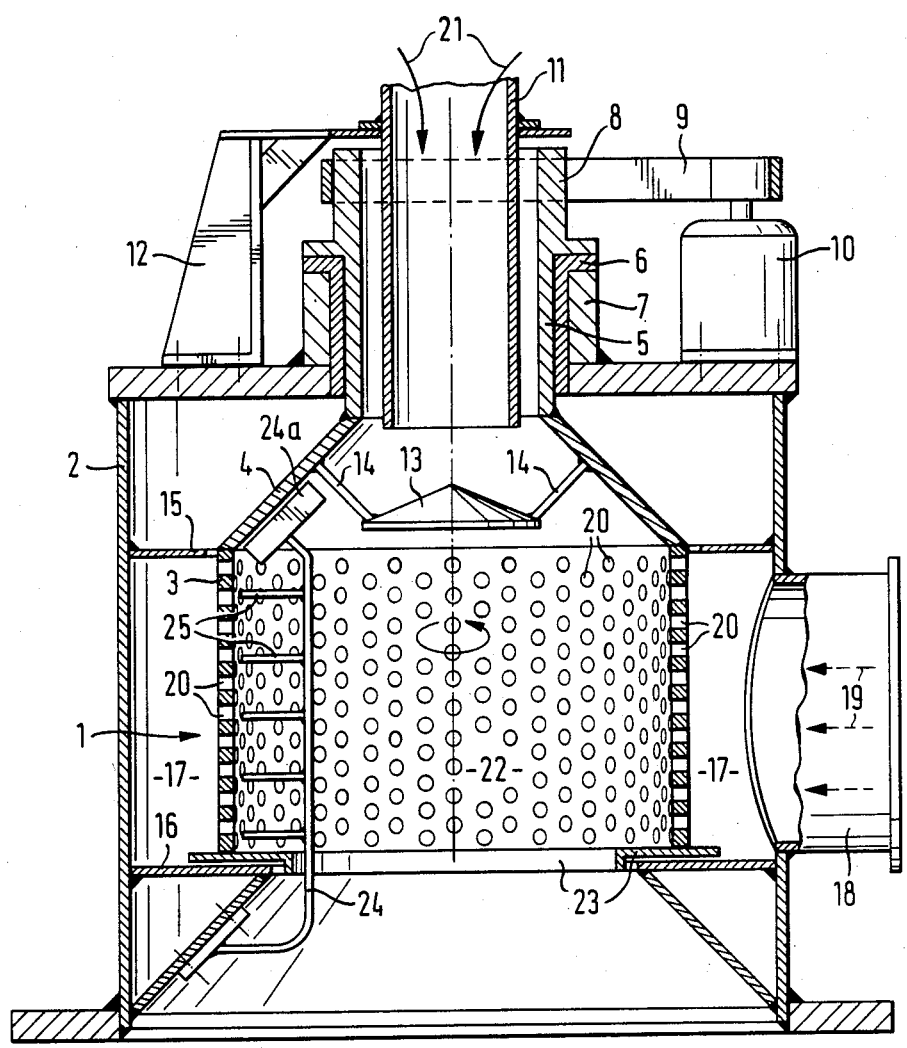
FIG. 1 shows an apparatus according to the invention with a cylindrical screening drum in a longitudinal section.

According to FIG. 1 a screening drum 1, open at the bottom, is supported vertically in a drum housing 2. The screening drum 1 comprises a cylindrical screening jacket 3, to which an upwardly tapering part 4 is joined. The latter is connected with a hollow drum axle 5, supported by means of a slide bearing bushing 6 in the bearing housing 7 of the drum housing 2. In its upper area the drum axle 5 comprises a pulley 8, that may be driven by a belt 9 and a motor 10 arranged on the drum housing 2.

A charging tube 11 is passed throug the hollow drum axle 5 and is connected rigidly by means of the holder 12 with the drum housing 2. A distributor disk 13 is located under the charge tube 11; it is fastened by means of the supports 14 to the upwardly tapering part 4 of the screening drum 1.

A drum chamber 17 is defined in the drum housing 2 by annular partitions 15 and 16, through which the drying gas is introduced through the fitting 18 applied tangentially to the drum housing 2 (arrows 19). The drying gas enters through bores 20 the rotating screenign drum 1 and forms with the solid particles charged from above through the charge tube 11 (arrows 21) in the swirl chamber 22 a fluid bed moving from top to bottom. At its lower end the screening jacket 3 has a flange ring 23 through which the solid particles dried in the fluid bed are discharged.

A holder 24, fastened stationarily to the drum housing 2, extends from below into the screening drum 3; it carries a plurality of agitator elements in the form of blades 25 entering the fluid bed 22. At its upper end the holder 24 is provided with a scraper 24a, located at the height of the distributor disk 13 and coordinated with the conically tapering part 4 of the screening drum 3.

Figure 2:
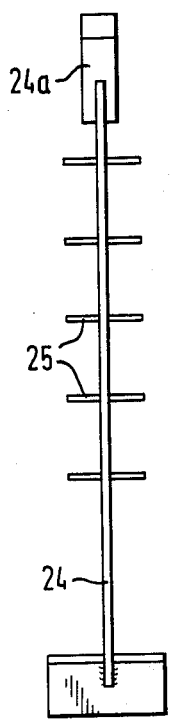
FIG. 2 shows a holder arm with rigid blades.

FIG. 2 shows the holder 24 in a singular position with the rigidly mounted blades 25.

Figure 3:
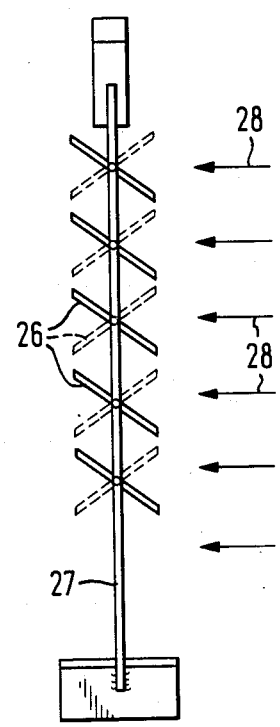
FIG. 3 shows a holder arm with pivotingly mounted blades.

According to the embodiment of FIG. 3, the blades are arranged pivotingly on the holder arm 27, with the blades being pivotable parallel or in opposing direction with respect to each other.

By means of the parallel pivoting of the blades 26 (solid lines) with respect to the direction of flow (arrows 28) of the fluid bed revolving with the screening drum, an axial flow component may be established, whereby the premature discharge of solid particles due to gravitational acceleration may be counteracted.

In contrast, in the position of the blades 26 indicated by broken lines the discharge components due to gravitational acceleration may be reinforced.

The swirling effect may be further enhanced by means of blades in opposing directions.

Figure 4:
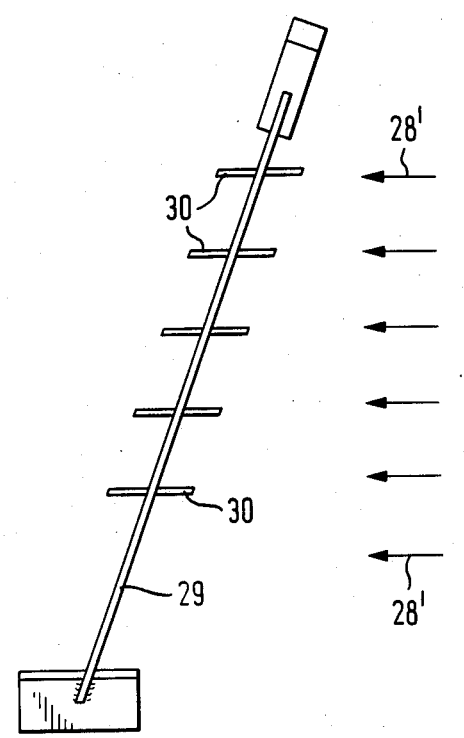
FIG. 4 shows a holder arm arranged obliquely to the rotating axle of the screening drum.

FIG. 4 shows a holder arm 29 set obliquely to the direction of flow (arrows 28') of the fluid bed, which carries blades 30 arranged parallel to each other and rigidly aligned in the direction of flow (arrows 28'). By these means, the front edges of the blades are offset stepwise in relation to each other, whereby oversize solid particles or nondivisible agglomerates which cannot pass between the blades, are moved in the discharge direction over the stepping gradient, so that they may be conveyed to separate discharge installations for oversize parts.

Figure 5:
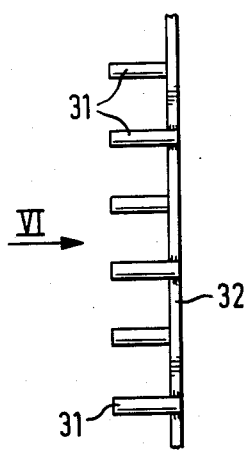
FIG. 5 shows a holder arm with agitator elements consisting of pins, in a lateral elevation.
Figure 6:
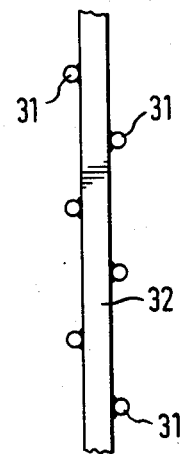
FIG. 6 shows the holder arm of FIG. 5 in a top view.

FIGS. 5 and 6 show agitator elements that may be produced industrially in a particularly simple manner in the form of pins 31, welded to the holder arm 32.

Figure 7:
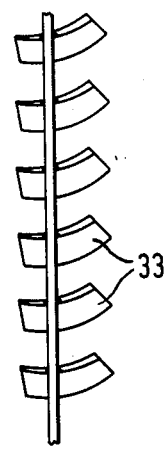
FIG. 7 shows a holder arm with plowshare-like agitator elements.

According to FIG. 7, the agitator elements are designed as plowshare-like blades 33, by means of the curvature and twisting of which radially outer layers of the fluid bed may be conveyed into radially inner layers and reversed.

The embodiment according to FIG. 8 corresponds essentially to the embodiment of FIG. 1, but with the screening jacket 3" of the screening drum 1" having the configuration of a truncated cone. A further difference is found in the holders 24', which are fastened by means of a transverse arm 34 to a shaft 35. The shaft 35 protrudes from above through the charge tube 11 into the screening drum chamber and passes through the distributor disk 13'.

The blades 25' fastened to the holder arms 25' may be driven at a rpm different from the rpm of the screening drum 1', so that a relative velocity appropriate for an optimum stirring effect may be established between the revolving turbulent layer 22' and the agitator elements. In principle, such revolving agitator elements are applicable to screening drums with cylindrical screening jackets also.

FIG. 9 shows a partial section of a screening drum 1" with a cylindrical screening jacket 3", wherein the agitator elements in the form of pins 35 are fastened to a shaft 37 carrying the rotating drives 38, whereby the agitator elements are rotated further and may be passed through the fluid bed in a whirling manner. The rotating drives 38 may comprise separate electric motors arranged on the shaft 37, or of angular drives driven by a coaxial shaft (not shown) within the shaft 37. The holder arms 24" for the agitator elements are in the form of shafts.

In actual operation, the solid particles of the screening drum are introduced through the charge tube stationarily attached to the housing (arrows 21) and transported by means of the distributor disk rotating with the screening drum and the conical part of the screening drum into the screening jacket. The solid particles are traversed in this location by the carrier gas flowing through the orifices of the screening jacket from the radially outside direction, so that they are maintained in suspension by the appreciable relative velocity between the solid particles and the carrier gas flow, thereby forming a turbulent layer and a fluid bed.

To insure that all of the solid particles introduced form a fluid bed and no appreciable portion of them remains on the surface of the screening jacket or is discharged with the gas from the turbulent layer in the radially inward direction, a suitable grain size distribution must be present, for example 80% with a particle diameter between 0.2 and 1.0 mm. However, this condition is rarely included in technical problem definitions and cannot be affected at a justifiable cost, so that agglomerates are formed which then behave in the manner of coarse particles, which cannot be maintained in suspension by the flow of the carrier gas and which settle radially outward onto the screening jacket.

The agitator elements immersing into the turbulent layer and moving at a velocity different from the rotating velocity of the fluid bed, comminute the agglomerates and distribute them uniformly. The comminuting effect may be enhanced by a suitable configuration of the agitator elements, such as for example the design of the front edge as a cutting edge. Similarly, the distribution function may be increased by means of plowshare-like blades.

Nondivisible agglomerates or coarse particles which would descend in the radially outward direction and settle on the inner surface of the screening jacket are removed mechanically from the revolving fluid bed and may be separated by sieving and screening from the treated solid particles. The large particles separated may be ground in a subsequent process step and reintroduced in the fluid bed.

What is claimed is:

1. A centrifugal drying apparatus for drying finely grained solid particles suspended in a fluid bed comprising:
    a means for housing the drying apparatus;
    means for screening solid particles wherein said means for screening exhibits a plurality of solid particle screening bores which allow passage of drying gas, said means for screening surrounds and defines a swirl chamber and is rotatingly mounted within said means for housing;
    means for charging the drying apparatus connected to said means for screening;
    means for introducing drying gas through said plurality of bores into the swirl chamber, wherein said solid particles and said drying gas form a fluid bed in said means for screening;
    means for agitating mechanically said solid particles in the fluid bed.

2. A centrifugal drying apparatus as in claim 1, wherein the drying gas is introduced tangentially to the drum housing through said plurality of bores.

3. A centrifugal drying apparatus as in claim 2, wherein said means for agitating comprises a plurality of mechanical means for agitating and comminuting immersed into the fluid bed.

4. A centrifugal drying apparatus as in claim 3, wherein the mechanical means for agitating and comminuting extend over a portion of the axial length of the means for screening.

5. A centrifugal drying apparatus as in claim 4, wherein said portion comprises the entire axial length of said means for screening.

6. A centrifugal drying apparatus as in claim 4, wherein the means for agitating and comminuting are fastened to arm means for holding, extending into the inside of said means for screening.

7. A centrifugal drying apparatus as in claim 6, wherein the arm means are joined stationarily to the means for housing.

8. A centrifugal drying apparatus as in claim 6, wherein the arm means are arranged rotatingly and further comprise first means for rotating at a rate different from that of the means for screening.

9. A centrifugal drying apparatus as in claim 8, wherein the arm means further comprise second means for rotating whereby the means for agitating and comminuting immersed in the fluid bed may be rotated essentially perpendicularly to the rotating axis of the means for screening.

10. A centrifugal drying apparatus as in claim 8, wherein the means for agitating comprises blades having the configuration of flat plates, arranged in planes essentially perpendicular to the rotating axis of the means for screening.

11. A centrifugal drying apparatus as in claim 8, wherein the means for agitating may be pivoted by a limited angular deflection around rotating axles arranged essentially perpendicularly to the rotating axle of the means for screening.

12. A centrifugal drying apparatus as in claim 11, wherein the means for agitating are pivotable parallel to each other.

13. A centrifugal drying apparatus as in claim 8, wherein the blades further comprise cutting edges pointing in the circumferential direction in the fluid bed.

14. A centrifugal drying apparatus as in claim 13, wherein the blades are curved in the manner of a plowshare.

15. A centrifugal drying apparatus as in claim 10, wherein the blades are arranged in trailing positions in relation to the fluid bed placed obliquely to the rotating axis of the means for screening.

16. A centrifugal drying apparatus as in claim 7, wherein the means for agitating comprises blades having configuration of flat plates, arranged in planes essentially perpendicular to the rotating axis of the means for screening.

17. A centrifugal drying apparatus as in claim 7, wherein the means for agitating may be rotated by a limited angular deflection around rotating axles arranged essentially perpendicularly to the rotating axis of the means for screening.

18. A centrifugal drying apparatus as in claim 17, wherein the means for agitating are pivotable parallel to each other.

19. A centrifugal drying apparatus as in claim 7, wherein the blades further comprise cutting edges pointing in the circumferential direction in the fluid bed.

20. A centrifugal drying apparatus as in claim 19, wherein the blades are curved in the manner of a plowshare.

21. A centrifugal drying apparatus as in claim 16, wherein the blades are arranged in trailing positions in relation to the fluid bed placed obliquely to the rotating axis of the means for screening.

22. A process for drying solid particles in a fluid bed comprising the steps of:
    exposing said solid particles to a centrifugal field in a screening drum;
    traversing said particles by a carrier flow of gas penetrating through orifices of said screening drum in essentially a radial manner from the outside of the drum to the inside of the drum to cause a swirling effect;

maintaining the solid particles in suspension in a fluid bed at an appreciable velocity relative to the flow of carrier gas;

mechanically agitating the solid particles in the fluid bed.

23. A process as in claim 1 wherein said step of mechanically agitating is performed by a plurality of agitator and comminuting tools immersed into the fluid bed.

* * * * *